United States Patent
Yokoyama

(10) Patent No.: US 10,887,285 B2
(45) Date of Patent: Jan. 5, 2021

(54) PRINTER AND CONTROL METHOD FOR PRINTER

(71) Applicant: SEIKO EPSON CORPORATION, Tokyo (JP)

(72) Inventor: Yasufumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/172,309

(22) Filed: Oct. 26, 2018

(65) Prior Publication Data
US 2019/0132285 A1 May 2, 2019

(30) Foreign Application Priority Data
Oct. 30, 2017 (JP) .................. 2017-208839

(51) Int. Cl.
| | |
|---|---|
| *H04N 1/00* | (2006.01) |
| *H04L 29/06* | (2006.01) |
| *G06F 3/12* | (2006.01) |
| *H04L 29/08* | (2006.01) |

(52) U.S. Cl.
CPC ............ *H04L 63/029* (2013.01); *G06F 3/126* (2013.01); *G06F 3/1229* (2013.01); *G06F 3/1236* (2013.01); *G06F 3/1288* (2013.01); *H04L 63/0209* (2013.01); *H04L 67/34* (2013.01); *H04N 1/00039* (2013.01); *H04N 1/00042* (2013.01); *H04N 1/00055* (2013.01); *H04N 1/00204* (2013.01)

(58) Field of Classification Search
CPC .... G06F 3/1259; G06F 3/1288; G06F 3/1285; G06F 3/1297; G06F 3/1212; G06F 3/126; G06F 3/1229; G06F 3/123; G06F 3/1231; G06F 3/1236; G06K 15/408; H04N 1/00962; H04N 1/00244; H04L 63/029
USPC ................ 358/1.11–1.18, 2.1, 1.9, 400–404; 709/201–203, 217–219; 717/168–178
See application file for complete search history.

(56) References Cited

U.S. PATENT DOCUMENTS

| | | | |
|---|---|---|---|
| 9,141,321 B1 * | 9/2015 | Poppenga | G06F 3/1258 |
| 9,883,066 B2 * | 1/2018 | Shin | G06F 3/1229 |
| 2001/0021954 A1 * | 9/2001 | Takamizawa | G06F 3/1204 710/19 |

(Continued)

FOREIGN PATENT DOCUMENTS

| | | |
|---|---|---|
| JP | 2005-327097 A | 11/2005 |
| JP | 2006-195692 A | 7/2006 |

(Continued)

*Primary Examiner* — Chad Dickerson
(74) *Attorney, Agent, or Firm* — Chip Law Group

(57) ABSTRACT

A printer capable of performing communication with a server via a firewall over a printer network includes a roll paper printing mechanism configured to perform printing on roll paper, a cut-form paper printing mechanism configured to perform printing on cut-form paper, and a processor configured to transmit, to the server, at least pairs of address information for the printer and status information for the printer, receive instruction information having been transmitted by the server, and execute processing based on the instruction information, and the processor causes transmission timing points for the transmission of the pairs to the server to differ for each of kinds of the status information.

12 Claims, 4 Drawing Sheets

(56) References Cited

U.S. PATENT DOCUMENTS

| | | | |
|---|---|---|---|
| 2004/0139188 A1* | 7/2004 | Imai | H04L 41/0273 709/223 |
| 2005/0099962 A1* | 5/2005 | Matsuda | H04L 41/0253 370/254 |
| 2006/0012828 A1* | 1/2006 | Ohta | H04W 48/00 358/1.18 |
| 2006/0143286 A1* | 6/2006 | Aoki | H04N 1/00209 709/220 |
| 2008/0140787 A1 | 6/2008 | Shima | |
| 2011/0261405 A1* | 10/2011 | Ito | G06F 1/3203 358/1.15 |
| 2014/0023382 A1 | 1/2014 | Kawana | |
| 2014/0082173 A1 | 3/2014 | Kaneko | |
| 2014/0115572 A1* | 4/2014 | Michishita | G06F 8/65 717/168 |
| 2014/0282481 A1* | 9/2014 | Ohara | G06F 8/65 717/172 |
| 2015/0062640 A1* | 3/2015 | Shigenobu | H04N 1/00477 358/1.15 |
| 2015/0277809 A1* | 10/2015 | Kim | G06F 3/126 358/1.15 |
| 2015/0277817 A1* | 10/2015 | Tsujioka | G06F 3/1234 358/1.14 |
| 2015/0331378 A1 | 11/2015 | Kawana | |
| 2016/0360059 A1* | 12/2016 | Homma | H04N 1/00962 |
| 2017/0265027 A1* | 9/2017 | Najari | G06Q 30/0261 |

FOREIGN PATENT DOCUMENTS

| | | | |
|---|---|---|---|
| JP | 2007-072740 A | | 3/2007 |
| JP | 2007072740 A | * | 3/2007 |
| JP | 2013-218452 A | | 10/2013 |
| JP | 2014-021303 A | | 2/2014 |
| JP | 2017-004175 A | | 1/2017 |
| JP | 2017-102941 A | | 6/2017 |

* cited by examiner

PRINTER AND CONTROL METHOD FOR PRINTER

This application claims priority under 35 U.S.C. § 119 to Japanese Patent Application No. 2017-208839 filed on Oct. 30, 2017, the entire disclosure of which is expressly incorporated by reference herein.

BACKGROUND

1. Technical Field

The present invention relates to a printer and a control method for a printer.

2. Related Art

Heretofore, it has been known that a printer (an image forming apparatus) and a server (a management server) communicate with each other via a firewall (see, for example, JP-A-2014-21303).

Like a printer disclosed in JP-A-2014-21303, a firewall is sometimes provided on a network to which a printer is connected. In this case, it is difficult for an external server existing outside the firewall to voluntarily monitor the printer because of the existence of the firewall.

SUMMARY

An advantage of some aspects of the invention is that a technique that, even when a firewall exists on a network to which a printer is connected, enables the printer to execute processing based on communication with an external server existing outside the firewall is provided.

An aspect of the invention is a printer capable of performing communication with a server via a firewall, and the printer includes a printing head configured to perform printing on a printing medium, and a processor configured to transmit, to the server, at least pairs of specific information for the printer and status information for the printer, receive instruction information having been transmitted by the server and having passed through the firewall using the specific information, and execute processing based on the instruction information. Further, the processor causes transmission timing points for the transmission of the pairs to the server to differ for each of kinds of the status information.

In the above configuration of the printer according to the first aspect of the invention, the transmission timing points for the transmission of the pairs to the server are caused to differ for each of kinds of the status information so as to allow the transmission timing points to be appropriate to the kinds of the status information, and further, even when the firewall exists, information transmitted from the server is allowed to appropriately pass through the firewall. Thus, the above configuration enables the printer to promptly execute processing based on the communication with the external server.

In the printer according to the first aspect of the invention, the processor may cause the transmission timing points to differ for each of at least start-up information, radio wave intensity information indicating a radio wave intensity, operation information indicating an operation status of the printing mechanism, and error information in relation to an error occurrence, as the kinds of the status information.

In the above configuration of the printer according to the first aspect of the invention, the transmission timing points are caused to differ for each of the start-up information, the radio wave intensity information, the operation information, and the error information so as to allow the transmission timing points to be appropriate to the above kinds of status information, and further, even when the firewall exists, information transmitted from the server is allowed to appropriately pass through the firewall. Thus, the above configuration enables the printer to promptly execute processing based on the communication with the external server.

Further, in the printer according to the first aspect of the invention, the specific information may be address information indicating an address of the printer, and the processor may receive the instruction information having passed through the firewall using the address information having been added by the server.

In the above configuration of the printer according to the first aspect of the invention, the printer receives the instruction information having been able to pass through the firewall because the server transmits the address information having been transmitted from the printer to the server. Thus, the above configuration enables the printer to execute processing based on the instruction information having been able to pass through the firewall and having been received from the appropriate server.

Further, in the printer according to the first aspect of the invention, the processor may transmit at least the pairs of the specific information and the status information even when the communication with the server is in an off-line state due to the error occurrence.

In the above configuration of the printer according to the first aspect of the invention, the pairs of the specific information and the status information are transmitted even when the communication with the server is in the off-line state due to the error occurrence. Thus, the above configuration enables the printer to transmit the pairs of the specific information and the status information to the external server even when an error is occurring in the printer.

Further, in the printer according to the first aspect of the invention, the printer may be capable of performing communication with a file server via the firewall, and may include a memory that stores firmware in the memory itself. The instruction information may be rewriting information for instructing rewriting of the firmware. Further, the processor may be configured to transmit, to the file server designated by the rewriting information, request information for requesting the specific information and firmware for rewriting, receive the firmware for rewriting having been transmitted by the file server and having passed through the firewall using the specific information, and rewrite the firmware stored in the memory into the firmware for rewriting.

In the above configuration of the printer according to the first aspect of the invention, when the instruction information having been received from the server is the rewriting information for instructing rewriting of the firmware, the processor receives the firmware for rewriting from the file server, and rewrites the firmware into the firmware for rewriting. Thus, even when the firewall exists, the above configuration allows the firmware for rewriting having been transmitted from the file server to appropriately pass through the firewall, and enables the printer to promptly rewrite the firmware into the firmware for rewriting.

Further, in the printer according to the first aspect of the invention, when the status information is the start-up information, the processor may transmit model information indicating a model of the printer and version information indicating a version of the firmware stored in the memory to the server.

In the above configuration of the printer according to the first aspect of the invention, when the status information is the start-up information, the model information and the version information are transmitted to the server. Thus, even when the firewall exists, the above configuration allows information having been transmitted from the server to appropriately pass through the firewall, and enables the execution of appropriate rewriting of the firmware upon start-up of the printer.

Another aspect of the invention is a control method for a printer capable of performing communication with a server via a firewall, and the control method includes a process of transmitting, to the server, at least pairs of specific information for the printer and status information for the printer; a process of receiving instruction information having been transmitted by the server and having passed through the firewall using the specific information; and a process of executing processing based on the instruction information. Further, for the transmission of the pairs each including the status information to the server, transmission timing points for the transmission of the pairs to the server are caused to differ for each of kinds of the status information.

In the above configuration of the control method for a printer, according to the second aspect of the invention, the transmission timing points for the transmission of the pairs each including the status information to the server through a communication unit are caused to differ for each of kinds of the status information so as to allow the transmission timing points to be appropriate to the kinds of the status information. Further, even when the firewall exists, information transmitted from the server is allowed to appropriately pass through the firewall. Thus, the above configuration enables the printer to promptly execute processing based on the communication with the external server.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
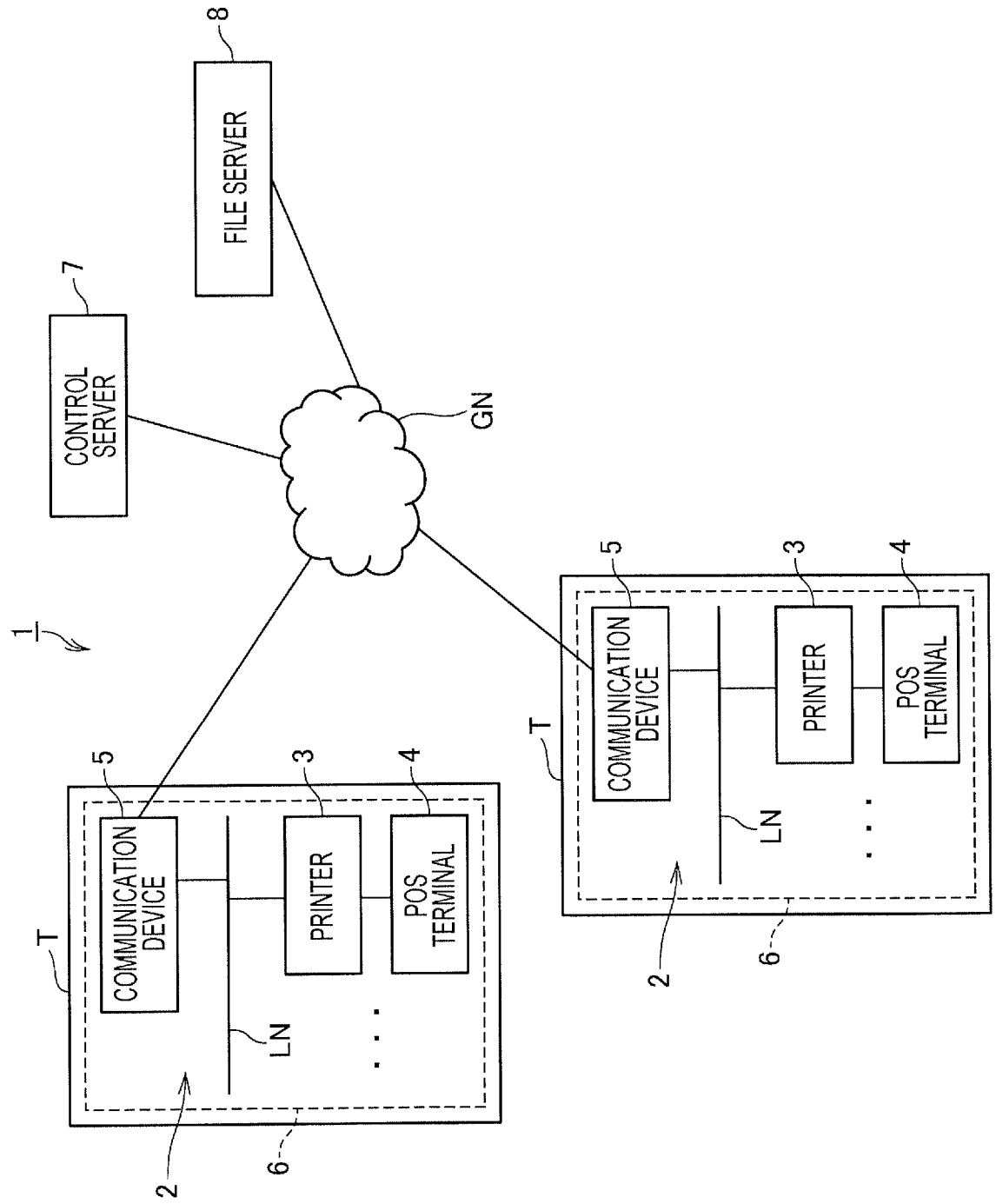
FIG. 1 is a diagram illustrating a configuration of an information processing system according to an embodiment of the invention.

FIG. 1 is a diagram illustrating a configuration of an information processing system 1, namely, an information processing system according to an embodiment of the invention.

The information processing system may include one or more shop systems, and in the present embodiment, the information processing system 1 includes a plurality of shop systems 2, as illustrated in FIG. 1. Each of the shop systems 2 is a system used in a shop T, and this shop T is a shop, such as a supermarket, a convenience store, a department store, or a restaurant. Any facility where products are provided and payments by customers are made in response to the provisions of the products is applicable to the shop T. In the present embodiment, the "products" mean not only products delivered to customers as physical objects, but also objects delivered to customers in exchange for counter values of the objects, such as services provided to customers or foods and drinks provided to customers.

Each of the shop systems 2, which is applied to the shop T, includes printers 3 and POS terminals 4. Each of the printers 3 includes printing mechanisms for performing printing on roll paper (the printing medium) and cut-form paper (the printing medium). Each of the POS terminals 4 is communicably connected to a corresponding printer 3 in accordance with a predetermined communication standard, and controls the corresponding printer 3. The each POS terminal 4 and the corresponding printer 3 are provided at, for example, a register counter which is provided in the shop T and at which customers make payments. Although FIG. 1 illustrates an example in which each of the shop systems 2 includes a plurality of combinations of one printer 3 and one POS terminal 4, the number of the combinations may be just one.

As illustrated in FIG. 1, the each shop system 2 includes a local area network LN. The each printer 3 is connected to this local area network LN. Further, a communication device 5 is connected to this local area network LN. The communication device 5 is an interface device for interconnecting the local area network LN and a global network GN including the Internet, a telephone network, and any other communication network. The communication device 5 has a function in relation to a modem (or an optical network unit (ONU)), a router function, a network address translation (NAT) function, a dynamic host configuration protocol (DHCP) server function, and the like. In the present embodiment, particularly, the communication device 5 has the function of a firewall 6. Thus, through this function of the firewall 6, the communication device 5 blocks accesses from the outside via the global network GN under predetermined conditions in order to enhance, at least, the security for the printers 3. Note that the "outside" means the outside of the firewall 6, and in FIG. 1, a control server 7 and a file server 8 correspond to the "outside".

In communication performed between equipment connected to the local area network LN (which corresponds to the each printer 3 in FIG. 1) and equipment connected to the global network GN (which corresponds to each of the control server 7 and the file server 8 in FIG. 1), the communication device 5 forwards data that is transmitted/received between the above two kinds of equipment. Note that, although the communication device 5 is represented by one block in FIG. 1, the communication device 5 may be configured to include a plurality of devices each associated with a corresponding one of functions of the communication device 5.

The control server 7 (the server) is connected to the global network GN. The control server 7 is a server apparatus capable of performing communication with the each printer 3. That is, the control server 7 executes a process, such as a predetermined arithmetic operation or the like, by being triggered by a request from a client, or the like. The control server 7 transmits data based on the result of the process to the client as needed. Note that, although, in FIG. 1, the control server 7 is represented by one block, this representation does not mean that the control server 7 is configured by a single server apparatus. For example, the control server 7 may be a server configured by a plurality of server apparatuses (which also include the file server 8). That is, it does not matter how the control server 7 is configured, provided that the control server 7 is configured to be capable of executing processes described later.

Further, the file server 8 is connected to the global network GN. The file server 8 is a server apparatus capable of performing communication with the each printer 3. The file server 8 includes a firmware data base 811 (see FIG. 2), and this firmware data base 811 stores therein firmware for rewriting (hereinafter referred to as "rewriting firmware"). When triggered by a request from a client, or the like, the file server 8 transmits rewriting firmware to the client. Note that, although, in FIG. 1, the file server 8 is represented by one block, this representation does not mean that the file server 8 is configured by a single server apparatus. That is, it does not matter how the file server 8 is configured, and, for example, the file server 8 may be included in the control server 7.

Figure 2:
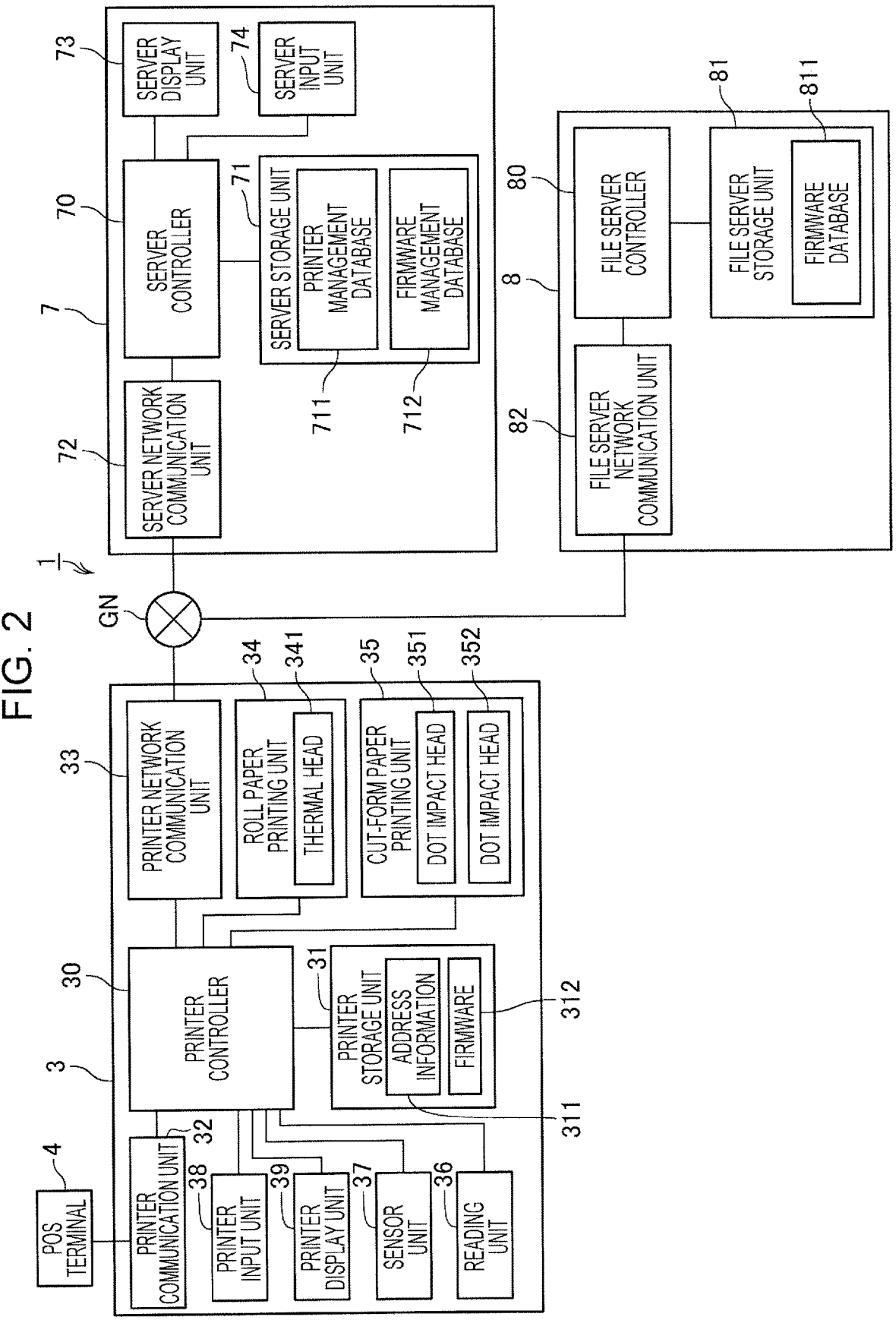
FIG. 2 is a block diagram illustrating a functional configuration of each of apparatuses included in the information processing system.

Next, a functional configuration of each of apparatuses included in the information processing system 1 will be described. FIG. 2 is a block diagram illustrating a functional configuration of each of apparatuses included in the information processing system 1.

As illustrated in FIG. 2, the information processing system 1 includes one of the POS terminals 4, one of the printers 3, the control server 7, and the file server 8.

The POS terminal 4 is, for example, a tablet-type (plate-shaped) terminal including a touch panel on a front-side wide area of the terminal. Note that the POS terminal 4 may be a stationary terminal, such as a desktop-type terminal or the like. In each of payments made by customers, the POS terminal 4 serves as a host computer for executing various processes in relation to the each payment and controlling the printer 3 (such as control for causing the printer 3 to issue a receipt).

The printer 3 is a printing apparatus including a printing mechanism for performing printing on roll paper using a roll paper transport mechanism and a thermal head (printing head) 341, and a printing mechanism for performing validation printing on the front surface or the back surface of cut-form paper using a cut-form paper transport mechanism and at least one of a dot impact head 351 and a dot impact head 352. Here, the validation printing means a printing configuration in which printing is performed on a printing medium (cut-form paper in the present embodiment) having been inserted from a paper insertion inlet that is formed on the housing of the printer 3, and the printing medium having been subjected to the printing is ejected from the paper insertion inlet serving as a paper ejection outlet, or from a paper ejection outlet that is formed separately from the paper insertion inlet.

As illustrated in FIG. 2, the printer 3 includes a printer controller 30 (a controller including a processor), a printer storage unit 31 (a storage unit including a memory), a printer communication unit 32 (a communication unit including a communication substrate, a communication circuit, communication elements, communication ports, and connectors), a printer network communication unit 33 (a communication unit including a communication substrate, a communication circuit, communication elements, communication ports, and connectors), a roll paper printing unit 34 (a printing unit including a printing mechanism), a cut-form paper printing unit 35 (a printing unit including a printing mechanism), a reading unit 36, a sensor unit 37, a printer input unit 38, and a printer display unit 39.

The printer controller 30 includes a CPU (a processor), a ROM module, a RAM module, an ASIC, a signal processing circuit, and the like, and controls the individual units of the printer 3. The printer controller 30 executes its processing by cooperation of hardware and software in such a way as to, for example, allow the CPU to execute its processing using programs, such as firmware 312, that are stored in and read from the ROM module, the printer storage unit 31, which will be described later in detail, and any other storage device; for example, allow the ASIC to execute its functions implemented in the ASIC; for example, allow the signal processing circuit to execute its signal processing; and allow any other component to execute its processing.

The printer storage unit 31 includes a nonvolatile memory, such as a hard disk or an EEPROM module, and stores data therein in such a way that enables the data to be rewritten. Further, the printer storage unit 31 stores address information 311 (specific information, identification information) therein. The address information 311 is address information, such as an IP address or a MAC address, for use in the identification of the printer 3 on the local area network LN. The address information 311 is specific information that is allocated to the printer 3 to allow the printer 3 to be identified on the local area network LN, and corresponds to the specific information. Further, the printer storage unit 31 stores therein the firmware 312, which is one of the programs for controlling the printer 3 (including the roll paper printing unit 34 and the cut-form paper printing unit 35). The specific information may be a product number or a serial number of the printer 3.

The printer communication unit 32 (a communication unit including a communication substrate, a communication circuit, communication elements, communication ports, and connectors) performs communication with the POS terminal 4 in accordance with a predetermined communication standard under the control of the printer controller 30. In the present embodiment, a case where the printer communication unit 32 performs communication in accordance with a predetermined wireless communication standard under the control of the printer controller 30 is exemplified.

The printer network communication unit 33 (a communication unit including a communication substrate, a communication circuit, communication elements, communication ports, and connectors) performs communication with each of devices connected to the global network GN (which include the control server 7 and the file server 8) in accordance with a predetermined communication standard under the control of the printer controller 30. Any appropriate communication standard, such as HTTP, WebSocket, or the like, is applicable to the communication standard used for the communication by the printer network communication unit 33.

The roll paper printing unit 34 includes mechanisms in relation to printing on roll paper, and the mechanisms include the thermal head 341, which executes printing of characters, images, and the like on the roll paper, a transport mechanism for transporting the roll paper, a cutter mechanism for cutting the roll paper, and the like.

The thermal head 341 is a head including a plurality of heating elements (not illustrated) composed of resistance materials and arranged in a direction intersecting with a transport direction of the roll paper, and executes printing of characters, images, and the like in such a way that electric current is flown into the heating elements to cause the heating elements to generate heat, and the generated heat is applied to a printed surface of the roll paper.

The printer controller 30 allows the roll paper printing unit 34 to issue a receipt, on the basis of printing data having been received from the POS terminal 4.

The cut-form paper printing unit 35 includes mechanisms in relation to printing on cut-form paper, and the mechanisms include the dot impact head 351, a carriage in which the dot impact head 351 is mounted, a motor for allowing this carriage to scan in a scanning direction, the dot impact head 352, a carriage in which the dot impact head 352 is mounted, a motor for allowing this carriage to scan in a scanning direction, a transport mechanism for transporting the cut-form paper, and the like.

Each of the dot impact head 351 and the dot impact head 352 is a serial impact dot matrix (SIDM) printing head that executes printing by hitting wires against an ink ribbon to thereby cause ink of the ink ribbon to be adhered. The dot impact head 351 and the dot impact head 352 are disposed at positions facing each other and interposing a transport path along which the cut-form paper is transported (this transport path being hereinafter referred to as a "cut-form paper transport path"). Note that this cut-form paper transport path is different from a transport path along which the roll paper is transported (this transport path being hereinafter referred to as a "roll paper transport path").

The dot impact head 351 executes printing on the front surface of cut-form paper being transported along the cut-form paper transport path, and the dot impact head 352 executes printing on the back surface of the cut-form paper. In the case where the cut-form paper is, for example, a check, the front surface of the cut-form paper is a surface on which front-surface description items including a payment destination, a payment person, a signature, a date, an amount of money, and the like are printed, and further is a surface on which magnetic information (for example, a set of magnetic ink character recognition (MICR) characters) is recorded. Further, in the case where the cut-form paper is, for example, a check, the back surface of the cut-form paper is a surface on which back-surface description items that are needed by the shop T and that include the personal identification number of a user that uses the check, a date, an amount of used money, and the like are printed.

The printer controller 30 allows the cut-form printing unit 35 to perform printing of the items corresponding to the front surface or the back surface of the cut-form paper.

In the following description, when the thermal head 341, the dot impact head 351, and the dot impact head 352 will be collectively referred to without being distinguished from one another, these heads will be referred to as just a "head".

The reading unit 36 reads the magnetic information that is magnetically recorded on the cut-form paper. The reading unit 36 is disposed at the position where the cut-form paper is transported, and includes an MICR head or the like for reading the magnetic information (for example, MICR characters) recorded on the cut-form paper.

The sensor unit 37 includes various sensors including a sensor for detecting the presence or absence of the cut-form paper on the cut-form transport path, a sensor for detecting the presence or absence of the roll paper on the roll paper transport path, and any other kind of sensor. The sensor unit 37 outputs detection results having been obtained through the detections by the individual sensors, to the printer controller 30. Based on the detection results, the printer controller 30 executes processes each associated with a corresponding one of the detection results.

The printer input unit 38 includes an input device provided in the printer 3, such as an operation panel or a touch panel. The printing input unit 38 detects a user's input operation to the input device, and outputs the detected input operation to the printer controller 30. Based on an input from the printer input unit 38, the printer controller 30 executes processing associated with the input operation to the input device.

The printer display unit 39 includes a display device, such as a plurality of LEDs or a display panel, and executes turning on/off of each of the LEDs in a predetermined form, displaying of information on the display panel, or the like, under the control of the printer controller 30.

As illustrated in FIG. 2, the control server 7 includes a server controller 70, a server storage unit 71, a server network communication unit 72, a server display unit 73, and a server input unit 74.

The server controller 70 includes a CPU (a processor), a ROM module, a RAM module, an ASIC, a signal processing circuit, and the like, and controls individual units of the control server 7. The server controller 70 executes its processing by cooperation of hardware and software in such a way as to, for example, allow the CPU to execute its processing using programs, such as firmware, that are stored in and read from the ROM module, the server storage unit 71, which will be described later in detail, and any other storage device; for example, allow the ASIC executes its functions implemented in the ASIC; for example, allow the signal processing circuit to execute its signal processing; and allow any other component to execute its processing.

The server storage unit 71 includes a nonvolatile memory, such as a hard disk or an EEPROM module, and stores data therein in a way that enables the data to be rewritten. Further, the server storage unit 71 includes printer management database 711 and a firmware management database 712. These databases will be described later in detail.

The server network communication unit 72 (a communication unit including a communication substrate, a communication circuit, communication elements, and connectors) performs communication with each of devices connected to the global network GN (which include the printer 3) in accordance with a predetermined communication standard under the control of the server controller 70. Any appropriate communication standard, such as HTTP, WebSocket, or the like, is applicable to the communication standard used for the communication by the server network communication unit 72.

The server display unit 73 includes a display panel, and displays various kinds of information on the display panel under the control of the server controller 70.

The server input unit 74 includes input devices including a keyboard, a mouse device, and any other input device, detects a user's input operation to any one of the input devices, and outputs the detected input operation to the server controller 70. Based on an input from the server input unit 74, the server controller 70 executes a process associated with the user's input operation to the any one of the input devices.

As illustrated in FIG. 2, the file server 8 includes a file server controller 80, a file server storage unit 81, and a file server network communication unit 82.

The file server controller 80 includes a CPU (a processor), a ROM module, a RAM module, an ASIC, a signal processing circuit, and the like, and controls individual units of the file server 8. The file server controller 80 executes its processing by cooperation of hardware and software in such a way as to, for example, allow the CPU to execute its processing using programs, such as application software, that are stored in and read from the ROM module, the file server storage unit 81, which will be described later in detail, and any other storage device; for example, allow the ASIC to execute its functions implemented in the ASIC; for example, allow the signal processing circuit to execute its signal processing; and allow any other component to execute its processing.

The file server storage unit 81 includes a nonvolatile memory, such as a hard disk or an EEPROM module, and stores data therein in a way that enables the data to be rewritten. Further, the file server storage unit 81 includes a file database 811. This database will be described later in detail.

The file server network communication unit 82 (a communication unit including a communication substrate, a communication circuit, communication elements, and connectors) performs communication with each of devices connected to the global network GN (which include the printer 3) in accordance with a predetermined communication standard under the control of the file server controller 80. Any appropriate communication standard, such as HTTP, WebSocket, or the like, is applicable to the communication standard used for the communication by the file server network communication unit 82.

By the way, the control server 7 performs monitoring of the statuses of the printer 3 of the shop system 2, and based on the result of the monitoring, the control server 7 allows predetermined processes, such as a process of reporting a status of the printer 3 to a user of the printer 3, to be executed. The control server 7 needs to obtain status information indicating the statuses of the printer 3 in order to monitor the statuses of the printer 3. For such the control server 7, however, as illustrated in FIG. 1, the printer 3 exists inside the firewall 6 and thereby is protected from unauthorized accesses or the like, and thus, it is difficult or impossible for the control server 7 to voluntarily access the printer 3 across the firewall 6. That is, in the case where the firewall 6 exists, it is difficult or impossible for the control server 7 to access the printer 3 to obtain the status information from the printer 3.

Here, in order to enable the printer 3 to be appropriately accessed, a configuration in which polling from the printer 3 to the control server 7 is periodically executed, and in response to the polling, the printer 3 transmits its status information can be considered. For this configuration, however, the control server 7 may be incapable of promptly obtaining status based on events, such as errors, that randomly (suddenly) occur in the printer 3. Moreover, frequent polling operations lead to the increase of communication load, and may cause the communication speed to become slower.

In order to solve this problem, the printer 3 of the present embodiment performs operation described below.

Figure 3:
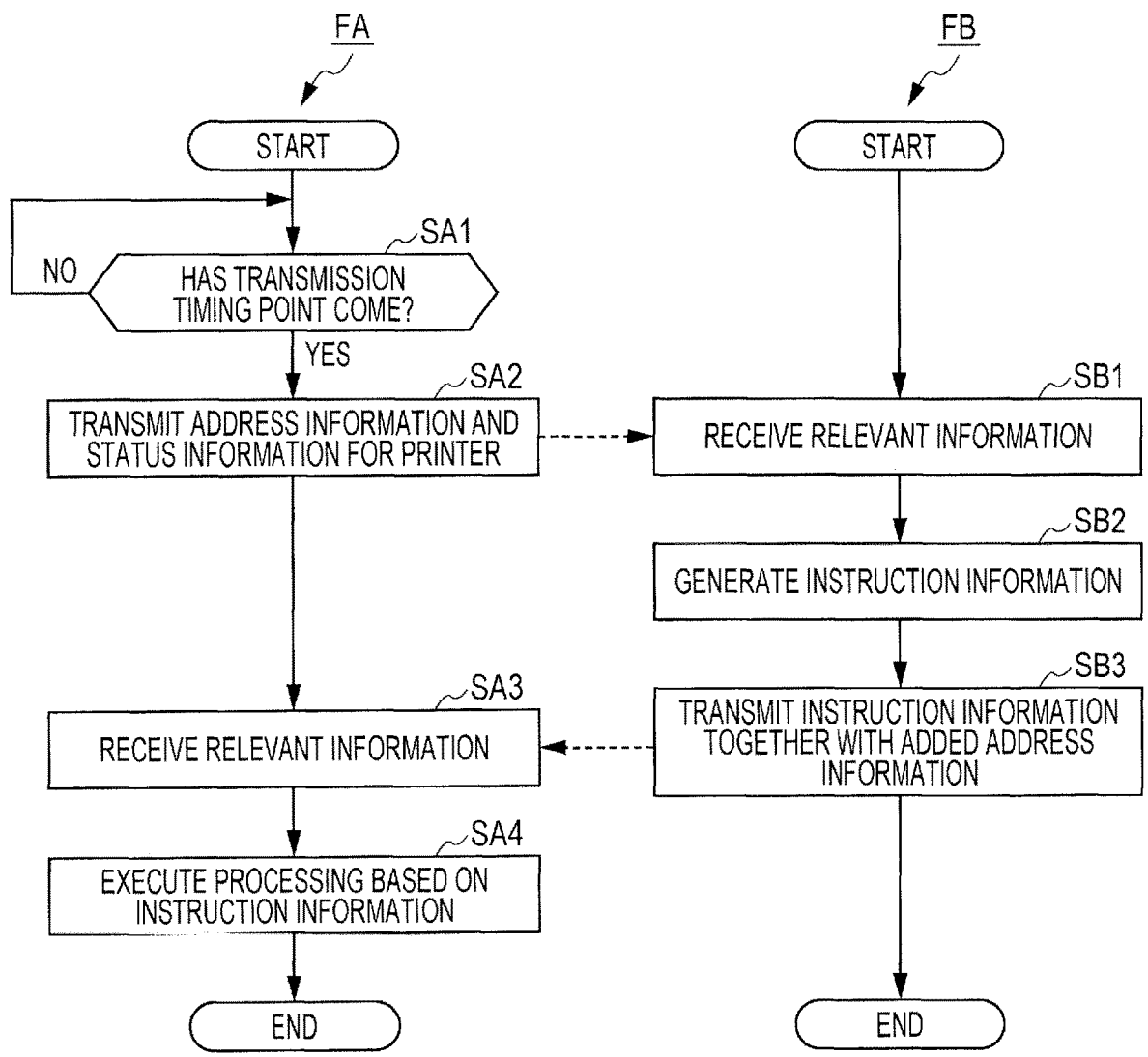
FIG. 3 is a flowchart illustrating operations of a printer and a control server that are included in the information processing system.

FIG. 3 is a flowchart illustrating the operations of the printer 3 and the control server 7. In FIG. 3, a flowchart FA illustrates the operation of the printer 3, and a flowchart FB illustrates the operation of the control server 7.

As illustrated in the flowchart FA in FIG. 3, the printer controller 30 of the printer 3 referrers to the printer storage unit 31, and determines whether or not a transmission timing point at which a pair of the address information 311 and status information for the printer 3 is to be transmitted through the printer network communication unit 33 has come (step SA1). The address information 311 and the status information for the printer 3, and the transmission timing point corresponding to the status information are stored in the printer storage unit 31.

Next, in the case where the determination is that the transmission timing point has come (step SA1: YES), the printer controller 30 transmits a pair of the address information 311 and the status information for the printer 3, together with an added serial number of the printer 3, to the control server 7 through the printer network communication unit 33 (step SA2).

Here, the operations of steps SA1 and SA2 will be described in detail.

In the present embodiment, as kinds of the status information for the printer 3, there exist start-up information, radio wave intensity information, operation information, and error information. The start-up information is information indicating that the power of the printer 3 has been turned on and the printer 3 has been started up. The radio wave intensity information is information indicating the radio wave intensity of at least one of the printer network communication unit 33 and the printer communication unit 32. The operation information is information indicating the operation statuses and the operation history of at least one of the roll paper printing unit 34 and the cut-form paper printing unit 35, which are included in the printer 3. The operation statuses are so-called statuses of the printer 3. The error information is information indicating an error that has occurred in the printer 3.

The printer 3 of the present embodiment causes transmission timing points for pairs of the address information 311 and status information for the printer 3 to differ for each of the above kinds of the status information.

Start-Up Information

First, the transmission timing point for the start-up information will be described.

When having determined that the power of the printer 3 has been turned on and the printer 3 has been started up, the printer controller 30 refers to the printer storage unit 31 and determines that the transmission timing point of the transmission of a pair of the address information 311 and the start-up information to the control server 7 has come (step SA1: YES). When having determined that the transmission timing point for the pair of the address information 311 and the start-up information has come, the printer controller 30 transmits the pair of address information 311 and the start-up information, together with an added serial number of the printer 3 (step SA2). Note that the operation of transmitting the start-up information will be described later in detail.

In this way, the printer controller 30 executes the process of step SA1 by handling the transmission timing point for the pair of the address information 311 and the start-up information as the timing point at which the printer 3 has been started up.

Radio Wave Intensity Information

Next, the transmission timing point for the radio wave intensity information will be described.

When the power of the printer 3 has been turned on, the printer controller 30 refers to the printer storage unit 31 and monitors the elapse of a radio wave intensity transmission period using a timer or the like. Further, every time the radio wave intensity transmission period has elapsed, the printer controller 30 determines that the timing point of the transmission of a pair of the address information 311 and the radio wave intensity information to the control server 7 has come (step SA1: YES). In the present embodiment, the radio wave intensity transmission period is related to communication, and the disconnection of the communication disables the execution of the printing. Thus, the radio wave intensity transmission period has a higher emergency degree than an operation transmission period, which will be described later in detail, and thus is set to a period that is shorter than the operation transmission period and that is, for example, one minute or five minutes. When having determined that the transmission timing point has come, the printer controller 30 obtains a radio wave intensity of at least one of the printer network communication unit 33 and the printer communication unit 32 at the time when the relevant transmission timing point has come. Further, the printer controller 30 transmits a pair of the address information 311 and radio wave intensity information indicating the obtained radio wave intensity, together with an added serial number of the printer 3, to the control server 7 (step SA2). Note that the printer controller 30 obtains the radio wave intensity of at least one of the printer network communication unit 33 and the printer communication unit 32 by means of an existing method.

In this way, the printer controller 30 executes the process of step SA1 by handling the transmission timing point for the pair of the address information 311 and the radio wave intensity information as the timing point at which the radio wave intensity transmission period has elapsed.

Operation Information

Next, the transmission timing point for the operation information will be described. In the present embodiment, there are two transmission timing points for the operation information.

First, a first transmission timing point for the operation information will be described.

When the power of the printer 3 has been turned on, the printer controller 30 refers to the printer storage unit 31 and monitors the elapse of an operation transmission period using a timer or the like. Further, every time the operation transmission period has elapsed, the printer controller 30 determines that the transmission timing point of the transmission of a pair of the address information 311 and the operation information to the control server 7 has come (step SA1: YES). In the present embodiment, the operation transmission period is set to a period that is longer than the radio wave intensity transmission period and that indicates, for example, one day (24 hours). In the case where the operation status is, for example, a head-usage accumulated total number, which will be described later in detail, even when the head-usage accumulated total number exceeds a predetermined head-usage accumulated total number, the occurrence of a situation in which the head shortly comes to its failure is quite rare, and thus, the emergency degree of the operation transmission period may be lower than that of the radio wave intensity transmission period. When having determined that the transmission timing point has come, the printer controller 30 transmits a pair of the address information 311 and the operation information, together with an added serial number of the printer 3, to the control server 7 (step SA2).

In this way, the printer controller 30 executes the process of step SA1 by handling the transmission timing point for the pair of the address information 311 and the operation information as the timing point at which the operation transmission period has elapsed.

Next, a second transmission timing point for the operation information will be described.

The printer controller 30 monitors the operation statuses of the roll paper printing unit 34 and the cut-form paper printing unit 35. Examples of the operation statuses include, but are not limited to, a status in which the printing operation is executed, and a status in which the printing operation is halted. The control server 7 does not need to periodically know these operation statuses, but just needs to know a change in the operation statuses only when the change has occurred, because the control server 7 is required just to transmit instruction information that is necessary at the time of, for example, the halt of the printing. When at least one of the operation statuses of the roll paper printing unit 34 and the cut-form paper printing unit 35 has changed, the printer controller 30 refers to the printer storage unit 31 and determines that the transmission timing point of the transmission of a pair of the address information 311 and the operation information to the control server 7 has come (step SA1). When having determined that the transmission timing point has come, the printer controller 30 transmits the pair of the address information 311 and the operation information, together with an added serial number of the printer 3 (step SA2).

In this way, the printer controller 30 executes the process of step SA1 by handling the transmission timing point for the pair of the address information 311 and the operation information as the timing point at which at least one of the operation statuses of the roll paper printing unit 34 and the cut-form paper printing unit 35 has changed.

Error Information

Next, the transmission timing point for the error information will be described.

When an error has occurred in the printer 3, the printer controller 30 refers to the printer storage unit 31, and determines that the transmission timing point of the transmission of a pair of the address information 311 and the error information to the control server 7 has come (step SA1). The error that occurs in the printer 3 indicates an event that disables the printing to be normally performed, such as out-of-paper for the roll paper, a paper jam for the roll paper, a paper jam for the cut-foam paper, the open state of a cover, the abnormal condition of each head, or the like. When having determined that the transmission timing point has come, the printer controller 30 transmits the pair of the address information 311 and the error information, together with an added serial number of the printer 3 (step SA2).

In this way, the printer controller 30 executes the process of step SA1 by handling the transmission timing point for the pair of address information 311 and the error information as the timing point of the error occurrence in the printer 3.

The processes of steps SA1 and SA2 are executed even when the state of the printer 3 is an off-line state. That is, the printer controller 30 transmits the pair of the address information 311 and status information to the control server 7 even in a state in which the printer controller 30 causes the communication of the printer network communication unit 33 to be in the off-line state. The off-line state is a state in which operations performed by the printer 3 and including the printing operation are limited in a case where an error is occurring, or the like. Further, the off-line state of the printer network communication unit 33 indicates a state in which, in order to limit the reception of the printer 3, the communication with devices connected to the global network GN is limited, and the relevant state is notified to the devices using a status or a signal. Since the devices are capable of knowing that the printer 3 is in the off-line state and the communication with the printer 3 is in a state of being to be limited, the devices refrain from communicating with the printer 3.

In the present embodiment, however, even in the case where the network communication unit 33 is in the off-line state due to the error occurrence in the printer 3, upon coming of a relevant transmission timing point, the printer controller 30 compulsorily transmits a pair of the address information 311 and the radio wave intensity information to the control server 7 through the printer network communication unit 33. The printer 3 is capable of executing the notification of the off-line state and the transmission/reception of data independently of each other, and thus, is capable of performing data communication even when being in the off-line state. Specifically, the printer 3 is capable of executing the notification of the off-line state and the transmission/reception of data independently of each other by employing a configuration in which the notification of the off-line state and the transmission/reception of data are performed through mutually different communication lines, or a configuration in which the notification of the off-line state and the transmission/reception of data are performed at mutually different timing points, although which of these configurations is to be employed depends on the configuration of the communication.

Let us return to the description of FIG. 3. As illustrated in flowchart FB, even in a state in which the printer 3 has notified the off-line state, the server controller 70 of the control server 7 receives the pair of the address information 311 and status information, together with the added serial number of the printer 3, through the server network communication unit 72 (step SB1).

Next, the server controller 70 executes processing corresponding to the kind of the received status information to generate instruction information for instructing the printer 3 to execute an operation (step SB2).

For example, in the case where the received status information is the radio wave intensity information, the server controller 70 determines whether or not the radio wave intensity indicated by the received radio wave intensity information satisfies a predetermined intensity. Next, in the case where the determination is that the radio wave intensity does not satisfy the predetermined intensity, the server controller 70 generates instruction information for instructing the execution of the operation of reporting that the radio wave intensity is low.

Further, for example, in the case where the received status information is the operation information, the server controller 70 generates instruction information on the basis of an operation history included in the received operation information. The operation history is a set of logs for a monitoring item. The monitoring item is an item that is determined in advance as a target of monitoring and logging of a statue of the printer 3. Examples of such a monitoring item include, but are not limited to, a monitoring item: CPU's temperature, for which information indicating the temperature of the CPU is logged; a monitoring item: a head-usage accumulated total number, for which the accumulated total number of usages (driving operations) of a head is logged; a monitoring item: a cutting-operation accumulated total number, for which the accumulated total number of cutting operations by a cutter for cutting the roll paper is logged; a monitoring item: a total number of memory usable days, for which the total number of usable days for a memory module, such as the ROM module or the RAM module, is logged on the basis of the number of accesses to the memory module. For example, when a head-usage accumulated total number indicated by a log corresponding to the monitoring item: a head-usage accumulated total number has exceeded a predetermined number, the server controller 70 generates instruction information for instructing the execution of the operation of reporting the necessity of the replacement of the head.

Further, for example, in the case where the received status information is the error information, the server controller 70 refers to a predetermined database in which pieces of error information indicating errors are each associated with a corresponding one of pieces of handling method information indicating methods for handling the errors. Further, the server controller 70 generates instruction information for instructing the execution of the operation of reporting handling method information indicating a method for handling an error indicated by the received error information, on the basis of the predetermined database to which the server controller 70 has referred. This instruction information may include the handling method information.

Note that a case where the received status information is the start-up information will be described later in detail.

Let us return to the description of flowchart FB illustrated in FIG. 3. The server controller 70 adds the address information 311 having been received in step SB1 to the instruction information having been generated in step SB2, and transmits the instruction information, together with the added address information 311, to the printer 3 through the server network communication unit 72 (step SB3).

In the communication device 5, conditions that permit passing through the firewall 6 are set. A non-limiting example of the conditions includes a condition indicating that the IP address of a transmission source should coincide with the IP address of a transmission destination. The communication device 5 stores therein a table providing the conditions that permit passing through the firewall 6, and is configured to block any packet that does not satisfy any of the conditions, and permit only a packet that satisfies any of the conditions. It is assumed that the communication device 5 of the present embodiment stores therein a table on which, at least, as a condition that permits passing through the firewall 6, the IP address of the control server 7 as the transmission source and the IP address of the printer 3 as the transmission destination are associated with each other. As described above, the address information 311 of the printer 3 is added to the instruction information transmitted by the control server 7 in step SB3. Thus, the instruction information having been transmitted in step SB3 passes through the firewall 6.

As illustrated in flowchart FA of FIG. 3, the printer controller 30 of the printer 3 receives the instruction information having passed through the firewall 6 using the added address information 311 (step SA3).

Next, the printer controller 30 executes processing based on the received instruction information (step SA4). The instruction information and the processing corresponding to the instruction information are stored in the printer storage unit 31.

For example, when having received instruction information for instructing the execution of the operation of reporting that the radio wave intensity is low, the printer controller 30 refers to the printer storage unit 31 and reports, in a predetermined reporting form, that the radio wave intensity of either the printer communication unit 32 or the printer network communication unit 33 is low, through the printer display unit 39. Further, when having received the instruction information for instructing the execution of the operation of reporting that the radio wave intensity is low, the printer controller 30 allows the POS terminal 4 to report that the radio wave intensity of either the printer communication unit 32 or the printer network communication unit 33 is low. Through these operations, a user of the printer 3 is able to recognize that the radio wave intensity is low.

Further, when having received instruction information based on the operation history included in the operation information, the printer controller 30 refers to the printer storage unit 31 and executes processing in relation to a monitoring item. In a specific example of this operation, when having received instruction information for instructing the execution of the operation of reporting that the replacement of a head is necessary, the printer controller 30 reports, in a predetermined reporting form, that the replacement of the head is necessary, through the printer display unit 39.

Further, the printer controller 30 allows the POS terminal 4 to report, in a predetermined reporting form, that the replacement of the head is necessary. Through these operations, a user of the printer 3 is able to recognize that the replacement of the head is necessary. Similarly, with respect to any other monitoring item, the execution of the reporting brings about the same advantageous effect.

Further, for example, when having received instruction information for instructing the execution of the operation of reporting handling method information indicating a method for handling an error, the printer controller 30 refers to the printer storage unit 31 and reports, in a predetermined reporting form, the handling method information through the printer display unit 39. Further, the printer controller 30 allows the POS terminal 4 to report the handling method information in a predetermined reporting form. Through these operations, a user of the printer 3 is able to recognize that an error is occurring in the printer 3, and is able to recognize how the occurring error should be handled. Further, when the control server 7 has received a cutter error indicating an error state in which a cutter blade is incapable of returning to its home position due to a paper jam or the like, the control server 7 transmits, to the printer 3, a command for instructing the execution of the operation of returning the cutter blade, in such a way that the command is included in instruction information transmitted to the printer 3. Further, based on the received command, the printer 3 drives the cutter blade to return it to its home position, and is recovered from the cutter error.

In this way, the printer controller 30 causes transmission timing points for pairs of the address information 311 and status information to differ for each of kinds of the status information. Specifically, the printer controller 30 causes the transmission timing points to differ for each of at least the start-up information, the radio wave intensity information, the operation information, and the error information. Thus, even when the firewall 6 exists between the printer 3 and the control server 7, the above configuration enables the printer controller 30 to promptly execute processing based on the communication with the control server 7. Further, the above configuration enables the printer controller 30 to promptly execute processing based on the communication with the control server 7 with respect to events that randomly occur in the printer 3. Particularly, the above configuration enables the printer controller 30 to promptly execute processing based on the communication with the control server 7 regardless of which of the start-up information, the radio wave intensity information, the operation information, and the error information relevant status information is.

Further, when the control server 7 transmits, to the printer 3, instruction information to which the control server 7 has added the address information 311 having been transmitted from the printer controller 30 to the control server 7, the printer controller 30 receives the instruction information having passed through the firewall 6 using the address information 311, having been transmitted from the printer controller 30 to the control server 7. Thus, this configuration enables the printer controller 30 to execute processing based on the instruction information having been received from the appropriate control server 7 that is monitoring the printer 3.

Further, even when the state of the printer network communication unit 33 is the off-line state because of an error occurrence in the printer 3, upon coming of a relevant transmission timing point, the printer controller 30 causes at least a pair of the address information 311 and status information for the printer 3 to be transmitted to the control server 7 through the printer network communication unit 33. Thus, even when an error is occurring in the printer 3, the above configuration enables the printer controller 30 to transmit pairs of the address information 311 and status information for the printer 3 to the control server 7. Further, the above configuration, which enables the printer controller 30 to transmit pairs of the address information 311 and status information tor the printer 3 even when an error is occurring in the printer 3, brings about, for example, an advantageous effect described below.

Here, it is assumed that the printer network communication unit 33 is configured not to transmit any pair of the address information 311 and status information for the printer 3 when the printer 3 is in the off-line state. In the case of such a configuration, an error has occurred in the printer 3 and even when transmission timing points at each of which operation information is to be transmitted have come during the error occurrence, the printer controller 30 is incapable of transmitting any operation information to the control server 7. With this disadvantage, even when the printer 3 is recovered from the error, the printer controller 30 is incapable of reporting that, for example, the replacement of the head is necessary, until a next transmission timing point comes. Thus, the above-described configuration, which allows the printer controller 30 to compellingly transmit pairs of the address information 311 and status information for the printer 3 to the control server 7 even when an error is occurring in the printer 3, enables the printer controller 30 to, upon recovery of the printer 3 from the error, promptly execute processing corresponding to status information being a transmission target at a transmission timing point having come during the error occurrence.

Next, the operation of the printer 3 in the case where the status information is the start-up information will be described in detail.

Figure 4:
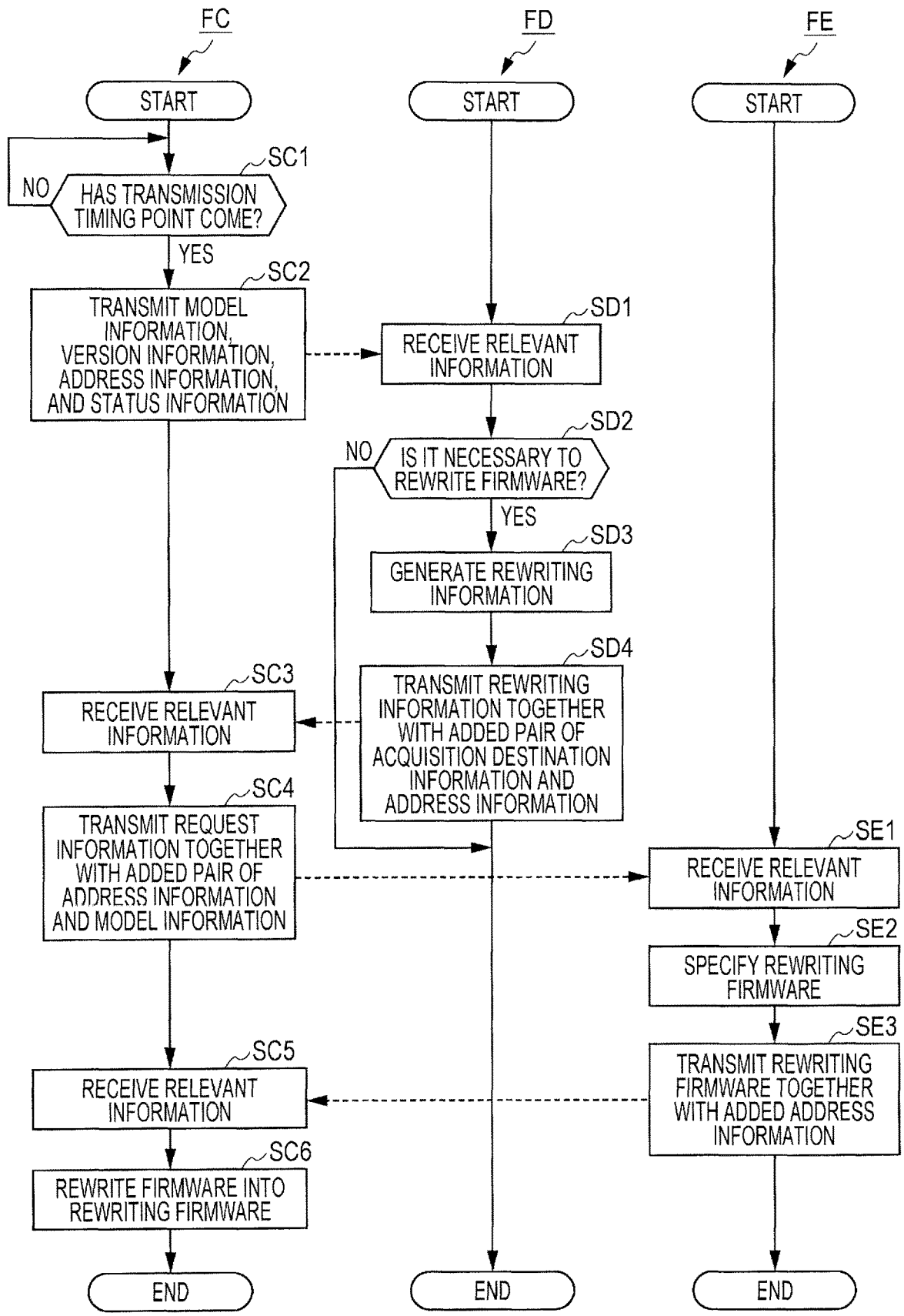
FIG. 4 is a flowchart illustrating operations of the printer, the control server, and a file server that are included in the information processing system.

FIG. 4 is a flowchart illustrating the operations of the printer 3, the control server 7, and the file server 8. In FIG. 4, a flowchart FC illustrates the operation of the printer 3; a flowchart FD illustrates the operation of the control server 7; and a flowchart FE illustrates the operation of the file server 8.

As illustrated in the flowchart FC in FIG. 4, the printer controller 30 of the printer 3 referrers to the printer storage unit 31, and determines whether or not a transmission timing point at which a pair of the address information 311 and the start-up information is to be transmitted through the printer network communication unit 33 has come (step SC1). As described above, the transmission timing point for the start-up information is a timing point at which the power of the printer 3 has been turned on and the printer 3 has been started up.

Subsequently, in the case where the determination is that the transmission timing point has come (step SC1: YES), the printer controller 30 transmits the pair of the address information 311 and the start-up information, together with an added set of the serial number of the printer 3, the model information for the printer 3, and version information indicating the version of the firmware 312, to the control server 7 through the printer network communication unit 33 (step SC2). Note that the version of the firmware 312 is a notation for identifying how many times a revision, updating, and the like have been performed on the firmware 312 since the initial development of the firmware 312 on a certain model of the printer 3.

As illustrated in the flowchart FD in FIG. 4, the server controller 70 of the control server 7 receives the pair of address information 311 and the start-up information, together with the added set of the serial number of the printer 3, the model information for the printer 3, and the version information for the firmware 312, through the server network communication unit 72 (step SD1).

Next, the server controller 70 determines whether or not it is necessary to rewrite the firmware 312 stored in the printer 3 (step SD2).

Here, the operation of step SD2 will be described in detail.

In step SD2, the server controller 70 refers to the firmware management database 712 stored by the server storage unit 71. The firmware management database 712 is a database including records in each of which model information for the printer 3 and version information indicating a version of the latest firmware 312 in a model indicated by the model information are stored so as to be associated with each other. The server controller 70 specifies, from the firmware management database 712, a record in which model information that coincides with the model information having been received in step SD1 is stored. Next, the server controller 70 compares version information stored in the specified record, with the version information having been received in step SD1. In the case were the result of the determination is that the version information stored in the specified record is different from the version information having been received in step SD1, the server controller 70 determines that it is necessary to rewrite the firmware 312 stored in the printer 3 (step SD2: YES). In contrast, in the case where the result of the determination is that the version information stored in the specified record coincides with the version information having been received in step SD1, the server controller 70 determines that it is unnecessary to rewrite the firmware 312 stored in the printer 3 (step SD2: NO).

In the case where the determination is that it is unnecessary to rewrite the firmware 312 stored in the printer 3 (step SD2: NO), the server controller 70 terminates the processing. In contrast, in the case where the determination is that it is necessary to rewrite the firmware 312 stored in the printer 3 (step SD2: YES), the server controller 70 generates rewriting information for instructing rewriting of the firmware 312 stored in the printer 3 (step SD3).

Next, the server controller 70 transmits the rewriting information having been generated in step SD3, together with an added pair of acquisition destination information indicating an acquisition destination which exists on the global network GN and from which rewriting firmware is to be acquired, and the address information 311 having been received in step SD1, to the printer 3 through the server network communication unit 72 (step SD4). In the present embodiment, the acquisition destination information is URL information indicating a uniform resource locator (URL) for use in an access to the file server 8. As is already known, the URL includes a communication scheme for use in the access to the file server 8, the address (domain name) of the file server 8, the identifier of a webpage, and the like.

As illustrated in the flowchart FC in FIG. 4, the printer controller 30 of the printer 3 receives the rewriting information having passed through the firewall 6 using the added address information 311 (step SC3).

Next, based on the acquisition destination information added to the received rewriting information, the printer controller 30 transmits request information for requesting rewriting firmware to the file server 8, together with an added pair of the address information 311 for the printer 3 and the model information for the printer 3, to the file server 8 through the printer network communication unit 33 (step SC4). That is, the printer controller 30 accesses the file server 8 indicated by the acquisition destination information to request downloading of the rewriting firmware.

As illustrated in the flowchart FE in FIG. 4, the file server controller 80 of the file server 8 receives the request information, together with the added pair of the address information 311 for the printer 3 and the model information for the printer 3, through the file server network communication unit 82 (step SE1).

Next, the file server controller 80 refers to the firmware database 811 stored in the file server storage unit 81, and specifies rewriting firmware to be transmitted to the printer 3 (step SE2).

Here, the operation of step SE2 will be described in detail. The firmware database 811 is a database storing therein records, the number of which is equal to the number of models of the printer 3, and in each of which model information indicating a model of the printer 3 and the latest rewriting firmware corresponding to the model are associated with each other. The file server controller 80 specifies, from the firmware database 811, a record storing therein model information that coincides with the model information that is added to the request information having been received in step SE1. Further, the file server controller 80 specifies rewriting firmware stored in the specified record, as the rewriting firmware to be transmitted to the printer 3.

The file server controller 80 transmits the rewriting firmware having been specified in step SE2 to the printer 3 through the file server network communication unit 82 (step SE3). When transmitting the rewriting firmware to the printer 3, the file server controller 80 transmits the rewriting firmware together with the address information 311 having been received in step SE1 and having been added to the rewriting firmware.

As described above, the conditions that permit passing through the firewall 6 are set in the communication device 5. It is assumed that the communication device 5 of the present embodiment stores therein a table on which, at least, as one of the conditions that permit passing through the firewall 6, the IP address of the file server 8 as a transmission source and the IP address of the printer 3 as a transmission destination are associated with each other. As described above, the address information 311 for the printer 3 is added to the rewriting firmware transmitted by the file server 8 in step SE3. Thus, the rewriting firmware having been transmitted in step SE3 passes through the firewall 6.

As illustrated in the flowchart FC in FIG. 4, the printer controller 30 receives the rewriting firmware having passed through the firewall 6 using the address information 311 having been transmitted to the file server 8 by the printer controller 30 (step SC5). Subsequently, upon receipt of the rewriting firmware, the printer controller 30 rewrites the firmware 312 stored in the printer storage unit 31 into the received rewriting firmware (step SC6).

In this way, the printer controller 30 transmits the pair of the address information 311 and the request information for requesting the rewriting firmware, to the file server 8 designated by the acquisition destination information having been added to the instruction information, through the printer network communication unit 33. Further, upon receipt of the rewriting firmware from the file server 8, the printer controller 30 rewrites the firmware 312 stored in the printer storage unit 31 into the received rewriting firmware. This configuration enables the printer controller 30 to, even when the firewall 6 exists, promptly rewrite the firmware 312 into the rewriting firmware in accordance with the instruction from the control server 7 when the printer 3 has been started up. Moreover, since the model information and the version information are transmitted to the control server 7, the above configuration enables the printer controller 30 to prevent the occurrence of a situation in which the firmware 312 is rewritten into firmware 312 corresponding to a different model, and thus, enables the printer controller 30 to execute appropriate rewriting of the firmware 312 when the printer 3 has been started up.

As described above, the printer 3 is capable of performing communication with the control server 7 (the server). The printer 3 includes the roll paper printing unit 34 (the printing mechanism), which performs printing on the roll paper (the printing medium); the cut-form paper printing unit 35 (the printing mechanism), which performs printing on the cut-form paper (the printing medium); the printer network communication unit 33 (a communication unit including a communication circuit, a communication substrate, communication elements, and connectors), which is capable of performing communication with the control server 7 via the firewall 6; and the printer controller 30 (a controller including the processor), which transmits at least a pair of the address information 311 (the specific information) and the status information for the printer 3 to the control server 7 through the printer network communication unit 33; receives the instruction information having been transmitted by the control server 7 and having passed through the firewall 6 using the address information 311 for the printer 3, through the printer network communication unit 33; and executes processing on the basis of the instruction information. The printer controller 30 causes transmission timing points for the transmissions of status information to the control server 7 through the printer network communication unit 33 to differ for each of kinds of the status information.

This configuration allows the printer controller 30 to cause the transmission timing points for the transmissions of status information to the control server 7 through the printer network communication unit 33 to differ for each of kinds of the status information so as to allow the transmission timing points to be appropriate to the kinds of the status information. Further, even when the firewall 6 exists, the above configuration allows information transmitted from the control server 7 to appropriately pass through the firewall 6, and thus enables the printer controller 30 to promptly execute processing based on the communication with the control server 7. Moreover, the above configuration allows the printer controller 30 to, for each kind of status information, perform communication at a corresponding appropriate transmission timing point, and thus, enables the prevention of communication overloading and communication delay that result from frequent communication.

Further, the printer controller 30 causes the transmission timing points to differ for each of at least the start-up information, the radio wave intensity information, the operation information, and the error information in relation to an error occurrence, as the kinds of the status information.

This configuration allows the printer controller 30 to cause the transmission timing points to differ for each of the start-up information, the radio wave intensity information, the operation information, and the error information in relation to an error occurrence, so as to allow the transmission timing points to be appropriate to the above kinds of the status information. Further, even when the firewall 6 exists, the above configuration allows information transmitted from the control server 7 to appropriately pass through the firewall 6, and thus, enables the printer controller 30 to promptly execute processing based on the communication with the control server 7.

Further, the printer controller 30 receives the instruction information having passed through the firewall 6 using the address information 311 having been added by the control server 7, through the printer network communication unit 33.

This configuration allows the printer controller 30 to receive the instruction information having been able to pass through the firewall 6 using the address information 311 having been transmitted to the control server 7 by the printer controller 30 and having been transmitted by the control server 7, and thus, the above configuration enables the printer controller 30 to execute processing based on the instruction information having been able to pass through the firewall 6 and having been received from the appropriate control server 7 that is monitoring the printer 3.

Further, even when the state of the printer network communication unit 33 is the off-line state due to the error occurrence, the printer controller 30 causes at least pairs of the address information 311 and status information to be transmitted through the printer network communication unit 33.

This configuration allows the printer controller 30 to transmit the pairs of the address information 311 and the status information for the printer 3 even when the printer network communication unit 33 is in the off-line state due to the error occurrence, and thus, the above configuration enables the printer controller 30 to transmit the pairs of the address information 311 and the status information for the printer 3 to the control server 7 even when an error is occurring in the printer 3. Further, the above configuration, which enables the printer controller 30 to transmit the pairs of the address information 311 and the status information for the printer 3 even when an error is occurring in the printer 3, enables the printer controller 30 to, upon recovery of the printer 3 from the error, promptly execute processing corresponding to status information being a transmission target at a transmission timing point having come during the error occurrence.

Further, the printer 3 includes the printer storage unit 31 (the storage unit), which stores the firmware 312 therein. The printer network communication unit 33 is capable of performing communication with the file server 8 via the firewall 6. The instruction information is rewriting information for instructing rewriting of the firmware 312. The printer controller 30 transmits a pair of the address information 311 and request information for requesting rewriting firmware, to the file server 8, which is designated by the rewriting information, through the printer network communication unit 33. Further, the printer controller 30 receives the rewriting firmware having passed through the firewall using the address information 311 having been transmitted by the file server 8, and rewrites the firmware 312 of the printer storage unit 31 into the received rewriting firmware.

This configuration allows the printer controller 30 to, when the instruction information having been received from the control server 7 is the rewriting information, receive the rewriting firmware from the file server 8 and rewrite the firmware 312 into the received rewriting firmware. Thus, even when the firewall 6 exists, the above configuration allows the rewriting firmware to appropriately pass through the firmware 6, and enables the printer controller 30 to promptly rewrite the firmware 312 into the received rewriting firmware in accordance with the instruction from the control server 7.

Further, when the status information is the start-up information, the printer controller 30 transmits the model information indicating the model of the printer 3 and the version information indicating the version of the firmware 312 stored in the printer storage unit 31 to the control server 7 through the printer network communication unit 33.

This configuration allows the printer controller 30 to, when the status information is the start-up information, transmit the model information and the version information. Thus, even when the firewall 6 exists, the above configuration allows information transmitted from the control server 7 and information transmitted from the file server 8 to appropriately pass through the firewall 6, and enables the printer controller 30 to execute appropriate rewriting of the firmware 312 when the printer 3 has been started up.

It should be noted that the above-described embodiment indicates just one embodiment of the invention, and any modification and application can be made on the above-described embodiment within the scope of the invention.

In the above-described embodiment, the configuration in which the control server 7 generates instruction information for instructing reporting about status information with respect to the radio wave intensity information, the operation information, and the error information, and the printer controller 30 performs the reporting using the printer display unit 39 or the POS terminal 4 has been exemplified. However, the content of the instruction indicated by the instruction information is not limited to the reporting, but may be an instruction for instructing the execution of processing in relation to the status information.

Further, in the above-described embodiment, the configuration in which the communication device 5, which functions as the firewall 6, stores therein the table on which, as a condition that permits passing through the firewall 6, the IP address of a transmission source to be permitted to pass through the firewall 6 is associated with the IP address of a transmission destination, and only packets that satisfy this condition are permitted to pass through the firewall 6 has been exemplified. However, information used by the communication device 5 in the condition that permits passing through the firewall 6 is not limited to only the IP addresses of the transmission source and the transmission destination, but port numbers or the like may be further added to the condition. In this case, in steps SA1, SC2, and SC4, the printer controller 30 further adds a target port number, and then performs the transmission.

Further, in the above-described embodiment, as the monitoring items, the monitoring item: CPU's temperature, the monitoring item: a head-usage accumulated total number, the monitoring item: a cutting-operation accumulated total number, and the monitoring item: a total number of memory usable days have been exemplified. However, the monitoring items are not limited to the above items, but may further include monitoring items, such as an accumulated total transport amount for the roll paper, and the like.

Further, an embodiment configured by a program in which the above-described control method for the printer 3 is implemented, a recording medium in which the program is recorded so as to be readable by a computer, or a transmission medium for transmitting the program is also applicable. As the above recording medium, a magnetic recording medium, an optical recording medium, or a semiconductor memory device can be used. Specific examples of portable types or fixed types of the recording medium include, but are not limited to, a flexible disk, a hard disk drive (HDD), a compact disk (CD), a digital versatile disk (DVD), a Blu-ray (trade mark) Disc, a magneto-optical disk, a flash memory, and a card-type recording medium. The printer 3 may be configured in such a way that the printer controller 30 reads the program stored in the recording medium into the RAM module, and executes the program.

Further, the above recording medium may be a nonvolatile storage device that is an internal storage device included in the printer 3, such as the read only memory (ROM) module, the HDD, or the like.

Further, the function block diagram having been described using FIG. 2 is a schematic diagram that, in order to make it easy to understand the invention, is illustrated in such a way that the functional configuration of each of the apparatuses is categorized on the basis of main processing contents. The configuration of each of the apparatuses can be further categorized into a larger number of constituent elements on the basis of processing contents. Further, the categorization can be also made in such a way that one constituent element executes a larger number of processes. Further, the process of each of the constituent elements may be executed by one hardware component, or may be executed by a plurality of hardware components. Further, the process of each of the constituent elements may be realized by one program, or may be realized by a plurality of programs.

Further, the process units of the flowcharts illustrated in FIGS. 3 and 4 are process units that are divided on the basis of main processing contents in order to make it easy to understand the processes of each of the printer 3, the control server 7, and the file server 8. The invention is not limited to the method of the division of the processing units and the names of the processing units. The processes of each of the printer 3, the control server 7, and the file server 8 can be further divided into a larger number of processing units on the basis of processing contents. Further, the division can be also made in such a way that one processing unit includes a larger number of processes. Further, the processing order of each of the above flowcharts is not limited to the illustrated example, but may be changed, provided that the same processing is performed.

What is claimed is:

1. A printer capable of performing communication with a server via a firewall, the printer comprising:
 a printing head configured to perform printing on a printing medium;
 a printer communication unit connected to a local area network, and configured to perform communication in accordance with a wireless communication standard; and
 a processor configured
 to periodically transmit, to the server, a first pair of specific information for the printer and first status information for the printer,
 to periodically transmit, to the server, a second pair of the specific information and second status information for the printer,
 to receive instruction information transmitted by the server and passed through the firewall using the specific information, and
 to execute processing based on the instruction information;
 wherein the first status information is radio wave intensity information indicating a radio wave intensity,
 the second status information is operation information indicating an operation status of a printing mechanism,
 a radio wave intensity transmission period of periodically transmitting the first pair is shorter than an operation transmission period of periodically transmitting the second pair.

2. The printer according to claim 1, wherein
 the processor is further configured to transmit, to the server, a third pair of the specific information and third status information for the printer, and a fourth pair of the specific information and fourth status information for the printer, the third status information being start-up information, and the fourth status information being error information in relation to an error occurrence, and the processor causes the transmission timing points to differ for each of the start-up information, the radio wave intensity information, the operation information, and the error information.

3. The printer according to claim 1, wherein the specific information is address information indicating an address of the printer, and the processor receives the instruction information passed through the firewall using the address information added by the server.

4. The printer according to claim 2, wherein the processor transmits the second pair of the specific information and the second status information even when the communication with the server is in an off-line state due to the error occurrence.

5. The printer according to claim 2,
wherein the printer is configured to perform communication with a file server via the firewall, and includes a memory that stores firmware in the memory itself,
wherein the instruction information is rewriting information for instructing rewriting of the firmware, and
wherein the processor transmits, to the file server designated by the rewriting information, the specific information and request information for requesting firmware for rewriting, receives the firmware for rewriting transmitted by the file server and passed through the firewall using the specific information, and rewrites the firmware stored in the memory into the firmware for rewriting.

6. The printer according to claim 5, wherein, when the processor transmits the third pair of the specific information and the third status information, the processor further transmits, to the server, model information indicating a model of the printer and version information indicating a version of the firmware stored in the memory.

7. A control method for a printer capable of performing communication with a server via a firewall, the control method comprising:
periodically transmitting, to the server, a first pair of specific information for the printer and first status information for the printer;
periodically transmitting, to the server, a second pair of the specific information and second status information for the printer;
receiving instruction information transmitted by the server and passed through the firewall using the specific information; and
executing processing based on the instruction information, wherein the first status information is radio wave intensity information indicating a radio wave intensity,
the second status information is operation information indicating an operation status of a printing mechanism,
a radio wave intensity transmission period of periodically transmitting the first pair is shorter than an operation transmission period of periodically transmitting the second pair.

8. The control method according to claim 7, further comprising:
transmitting, to the server, a third pair of the specific information and third status information for the printer, and a fourth pair of the specific information and fourth status information for the printer,
wherein the third status information is start-up information,
the fourth status information is error information in relation to an error occurrence, and
transmission timing points are caused to differ for each of the start-up information, the radio wave intensity information, the operation information, and the error information.

9. The control method according to claim 7, wherein the specific information is address information indicating an address of the printer, and the instruction information passed through the firewall using the address information added by the server is received.

10. The control method according to claim 8, wherein the second pair of the specific information and the second status information is transmitted even when the communication with the server is in an off-line state due to the error occurrence.

11. The control method according to claim 8,
wherein the printer is configured to perform communication with a file server via the firewall, and stores firmware in the printer itself,
wherein the instruction information is rewriting information for instructing rewriting of the firmware, and
wherein the specific information and request information for requesting firmware for rewriting are transmitted to the file server designated by the rewriting information, the firmware for rewriting transmitted by the file server and passed through the firewall using the specific information is received, and the firmware is rewritten into the firmware for rewriting.

12. The control method according to claim 11, wherein, when the processor transmits the third pair of the specific information and the third status information, model information indicating a model of the printer and version information indicating a version of the firmware are transmitted to the server.

* * * * *